(12) United States Patent
Kobayashi et al.

(10) Patent No.: US 11,131,343 B2
(45) Date of Patent: Sep. 28, 2021

(54) BUSH

(71) Applicants: DENSO CORPORATION, Kariya (JP); OILES CORPORATION, Tokyo (JP)

(72) Inventors: Takashi Kobayashi, Kariya (JP); Akihiko Okimura, Fujisawa (JP); Tetsuya Katamine, Fujisawa (JP)

(73) Assignees: DENSO CORPORATION, Kariya (JP); OILES CORPORATION, Tokyo (JP)

( * ) Notice: Subject to any disclaimer, the term of this patent is extended or adjusted under 35 U.S.C. 154(b) by 693 days.

(21) Appl. No.: 15/780,873

(22) PCT Filed: Nov. 17, 2016

(86) PCT No.: PCT/JP2016/084181
§ 371 (c)(1),
(2) Date: Jun. 1, 2018

(87) PCT Pub. No.: WO2017/094523
PCT Pub. Date: Jun. 8, 2017

(65) Prior Publication Data
US 2018/0347627 A1 Dec. 6, 2018

(30) Foreign Application Priority Data
Dec. 3, 2015 (JP) .............................. JP2015-236687

(51) Int. Cl.
*F16C 33/20* (2006.01)
*F16C 17/02* (2006.01)
(Continued)

(52) U.S. Cl.
CPC .......... *F16C 33/20* (2013.01); *B29C 45/2602* (2013.01); *B29C 45/4005* (2013.01);
(Continued)

(58) Field of Classification Search
CPC ........ F16C 33/20; F16C 17/023; F16C 17/22; F02M 26/65; F02M 26/67; B29C 45/2602; B29C 45/4005
See application file for complete search history.

(56) References Cited

U.S. PATENT DOCUMENTS 5,865,443 A 2/1999 Abe
6,086,805 A 7/2000 Abe
(Continued)

FOREIGN PATENT DOCUMENTS

CN 101918724 12/2010
JP 60-127120 8/1985
(Continued)

OTHER PUBLICATIONS

International Search Report for PCT/JP2016/084181, dated Feb. 14, 2017, 5 pages.
(Continued)

*Primary Examiner* — Stella K Yi
(74) *Attorney, Agent, or Firm* — Nixon & Vanderhye P.C.

(57) ABSTRACT

Provided is a resin bush capable of slidably supporting a shaft when the bush has been fitted in a housing; particularly, a resin bush suitable for use in an environment in which the effects of a difference in thermal expansion coefficients are likely to be prominent, such as a high-temperature environment, even when the housing and the shaft are made of a material such as a metal that has a different thermal expansion coefficient from that of the resin bush. In the resin bush (1), which is molded by extrusion molding, a slit (12) is formed from one axial end surface (11a) towards another axial end surface (11b). A recessed section (13) for a gate (a gate position), which is provided to the one axial end surface (11a), is provided in a position that is deviated from being symmetrical with the slit (12), at least with respect to a center axis O of a bush body (10). The resin used for the
(Continued)

material of the bush (1) is a resin having excellent heat resistance and chemical resistance, such as PPS resin or a PEEK resin.

4 Claims, 6 Drawing Sheets

(51) Int. Cl.
*F02M 26/65* (2016.01)
*F02M 26/67* (2016.01)
*F16C 17/22* (2006.01)
*B29C 45/26* (2006.01)
*B29C 45/40* (2006.01)
*F02M 26/72* (2016.01)

(52) U.S. Cl.
CPC ............ *F02M 26/65* (2016.02); *F02M 26/67* (2016.02); *F16C 17/02* (2013.01); *F16C 17/22* (2013.01); *F02M 26/72* (2016.02); *F16C 2208/36* (2013.01); *F16C 2208/52* (2013.01); *F16C 2220/04* (2013.01)

(56) References Cited

U.S. PATENT DOCUMENTS

| 6,224,814 | B1 | 5/2001 | Abe | |
|---|---|---|---|---|
| 6,468,068 | B1 | 10/2002 | Abe | |
| 2007/0017732 | A1* | 1/2007 | Harer | ...................... F16C 29/02 |
| | | | | 180/444 |
| 2015/0204381 | A1* | 7/2015 | Zaike | ...................... F16C 29/02 |
| | | | | 384/202 |
| 2015/0370213 | A1* | 12/2015 | Iikura | .................. G03G 15/751 |
| | | | | 399/117 |

FOREIGN PATENT DOCUMENTS

| JP | 9-42455 | 2/1997 |
|---|---|---|
| JP | 9-184513 | 7/1997 |
| JP | 2005-36832 | 2/2005 |
| JP | 2008-285024 | 11/2008 |
| JP | 2012-107572 | 6/2012 |
| JP | 5737463 | 6/2015 |

OTHER PUBLICATIONS

Search Report issued CN Appln. No. 201680069845.3 dated Apr. 1, 2019 (w/translation).

* cited by examiner

Fig.5
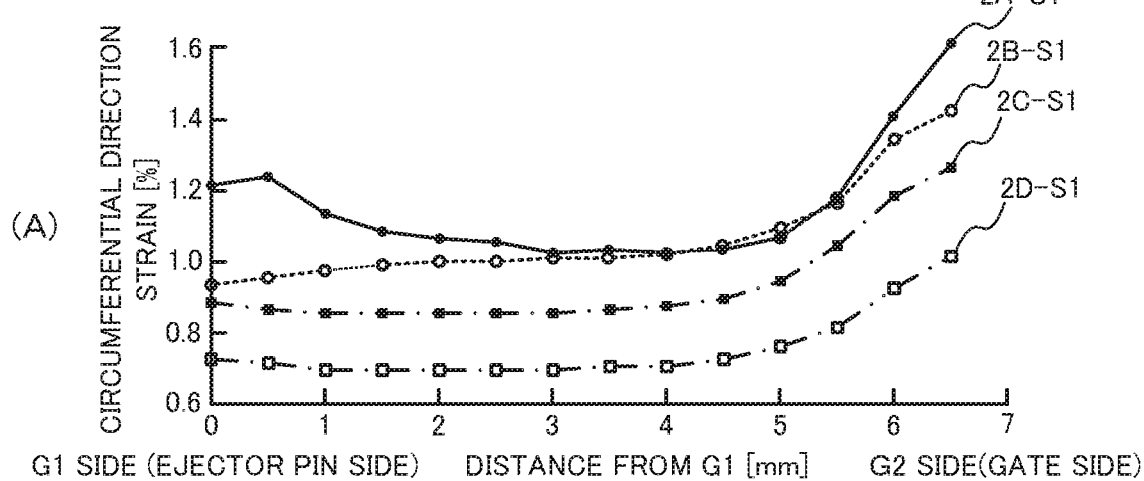
(A)
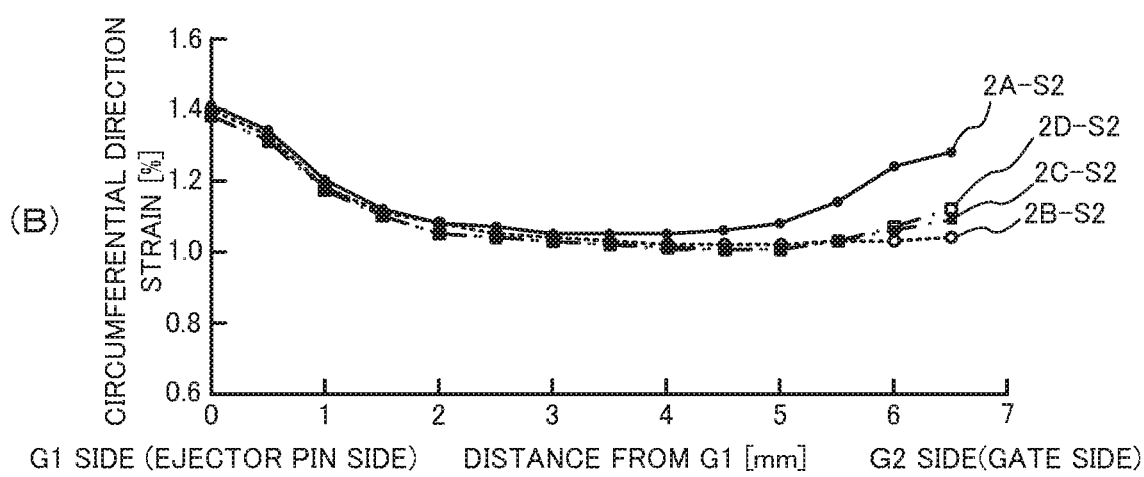
(B)
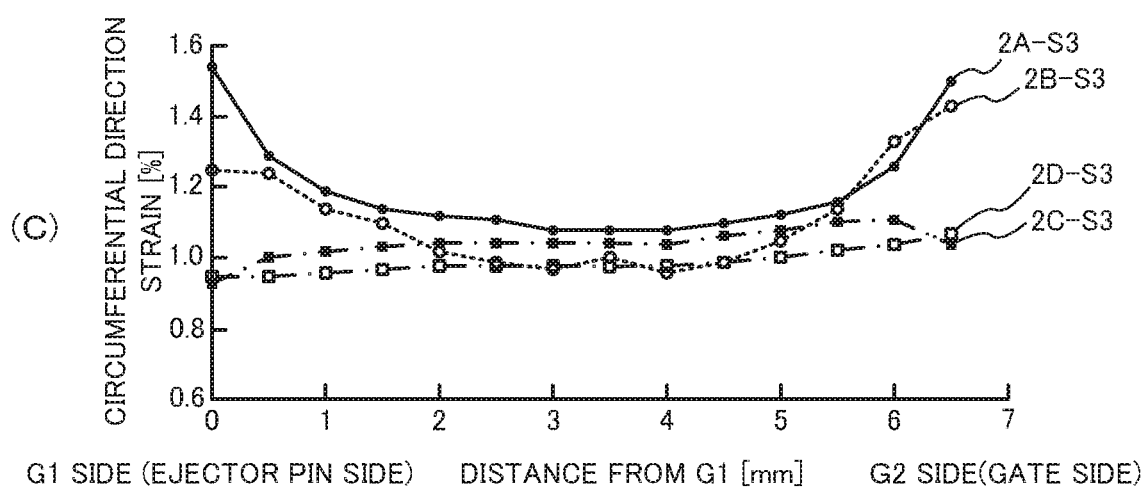
(C)

BUSH

This application is the U.S. national phase of International Application No. PCT/JP2016/084181 filed 17 Nov. 2016, which designated the U.S. and claims priority to JP Patent Application No. 2015-236687 filed 3 Dec. 2015, the entire contents of each of which are hereby incorporated by reference.

TECHNICAL FIELD

The present invention relates to a resin bush, and in particular to a resin bush suitable for slidably supporting a shaft that drives an EGR valve of an exhaust gas recirculation device (EGR device).

BACKGROUND ART

An EGR device is a device that takes out a portion of exhaust gas after combustion in an engine mounted on a vehicle and makes the gas to be sucked again to reduce nitrogen oxides in the exhaust gas or to improve fuel efficiency, and comprises: a reflux passage, which returns the portion of exhaust gas from an exhaust passage of the engine to an intake passage; an EGR valve, which is provided in the reflux passage and adjusts a flow rate of the exhaust gas refluxed back to the intake passage by adjusting the opening of the valve; a shaft, which drives the EGR valve; and a bush, which slidably supports the shaft. Here, the bush is fitted, for example, in a housing (See the Patent Literature 1, for example).

CITATION LIST

Patent Literature

Patent Literature 1: Japanese Unexamined Patent Application Laid-Open No. 2012-107572

SUMMARY OF INVENTION

Technical Problem

An EGR device deals with high-temperature gas after combustion. Nitrogen oxides and sulfur oxides in exhaust gas react with water to produce nitric acid and sulfuric acid. Accordingly, as a bush for an EGR device, has been used a metallic bush that is highly resistant to heat and provided with countermeasure against nitric acid, sulfuric acid, and the like. This kind of bush is expensive, and thus less-expensive resin bushes have been proposed recently.

In the case, however, where a bush into which a shaft is inserted is fitted in a housing as in the EGR device described in the Patent Literature 1, following problems occur. That is to say, a metallic housing and a metallic shaft are used in an EGR device because the device assumes use under high temperature. Thus, in the case where a resin bush is used, the bush thermally expands more greatly than the housing and the shaft under high temperature, and a gap between the inner peripheral surface of the bush and the outer peripheral surface of the shaft becomes larger, and there is a possibility of occurrence of backlash of the shaft, while the outer peripheral surface of the bush is pressed against the inner peripheral surface of the housing, and there is a possibility of generation of creep of the bush.

The present invention has been made considering the above situation, and an object of the invention is to provide a resin bush that can slidably support a shaft in a state that the bush is fitted in a housing, and in particular to a resin bush that is suitable for use in an environment where the effect of a difference in thermal expansion coefficient tends to appear, such as under high temperature, in the case where metal or the like having a different thermal expansion coefficient from that of the resin bush is used as material of the housing and the shaft.

Solution to Problem

To solve the above problem, the present invention provides a resin bush that has a slit formed from one axial end surface of a cylindrical bush body toward the other axial end surface. As resin for material of the bush, is used resin that is superior in heat resistance and chemical resistance such as polyphenylene sulfide (PPS) resin or polyether ether ketone (PEEK) resin, for example. In the case where the resin bush of the present invention is manufactured by injection molding, it is favorable that a gate position provided in either axial end surface or in an outer peripheral surface is provided at a position that is at least deviated from a position axisymmetric to the slit with respect to the central axis of the cylindrical bush body.

Advantageous Effects of Invention

According to the present invention, the bush can contract and expand in radial direction owing to the slit formed from the one axial end surface toward the other axial end surface. Accordingly, it is possible to absorb difference in thermal expansion coefficient from the shaft as the object to be supported and the housing in which the bush of the present invention is fitted. Thus, it is possible to provide the resin bush that can slidably support the shaft in a state that the bush is fitted in the housing and in particular that is suitable for use in an environment in which difference in thermal expansion coefficient tends to appear, such as in a high-temperature environment, in the case where material, such as metal, having a different thermal expansion coefficient from that of the resin bush is used as material of the housing and the shaft.

Further, in the case where the resin bush according to the present invention is manufactured by injection molding, it is possible to deviate the gate position, which is a weak in strength, from a place on which bending stress caused by change of the slit width due to the effect of thermal expansion is concentrated, by providing the gate position in either axial end surface of the cylindrical bush body or in the outer peripheral surface of the cylindrical bush body at a position at least deviated from a position axisymmetric to the slit with respect to the central axis of the cylindrical bush body. Thereby, it is possible to improve the strength of the resin bush according to the present invention.

BRIEF DESCRIPTION OF DRAWINGS

FIGS. 5(A) to 5(C) are diagrams illustrating analysis results of the structural analysis of the test pieces 2A to 2D of the bush 1.

DESCRIPTION OF EMBODIMENT

In the following, one embodiment of the present invention will be described.

Figure 1:
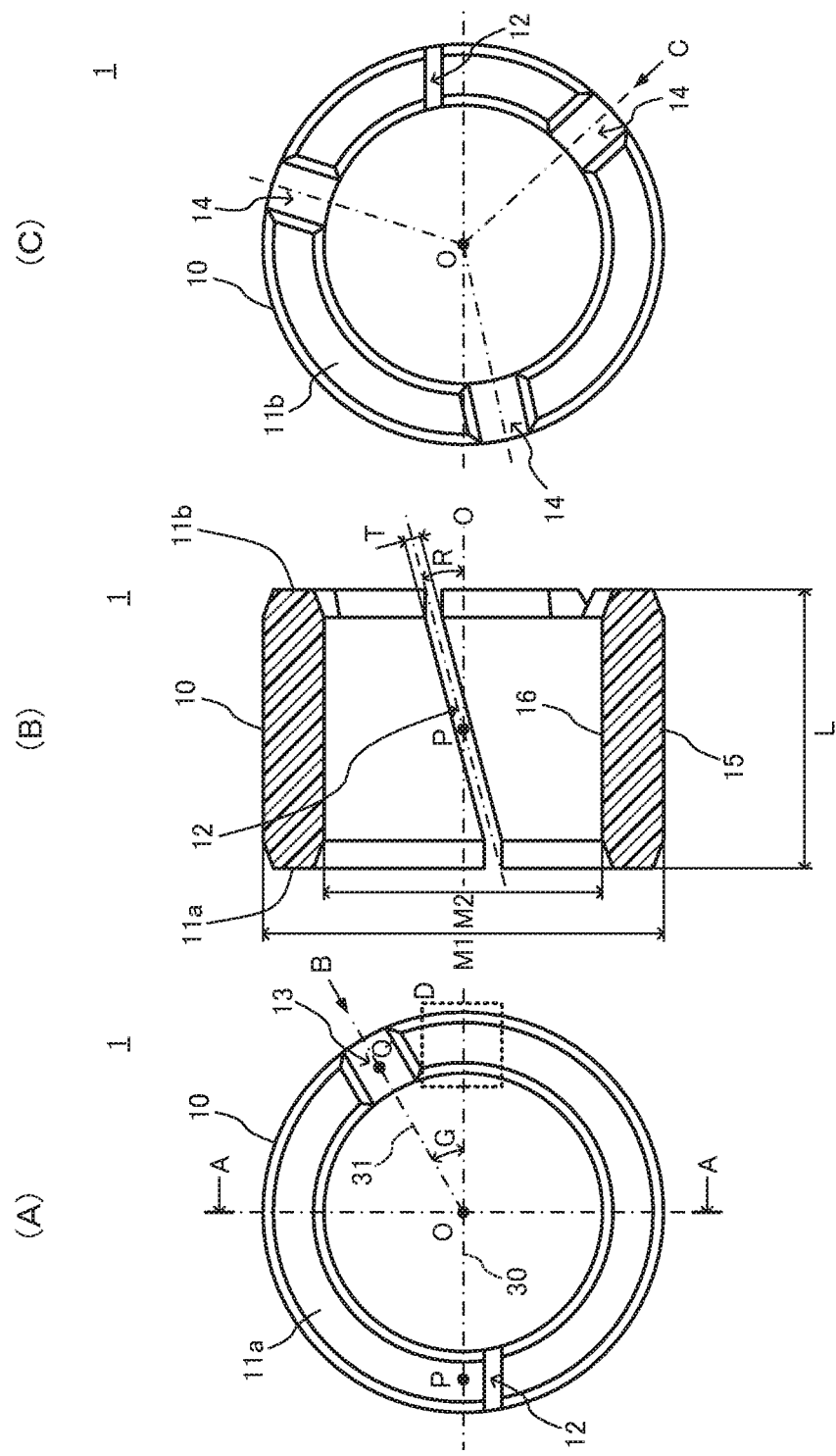
FIGS. 1(A) and 1(C) are respectively a front view and a back view of a bush according to one embodiment of the present invention, and FIG. 1(B) an A-A cross-sectional view of the bush illustrated in FIG. 1(A)
Figure 2:
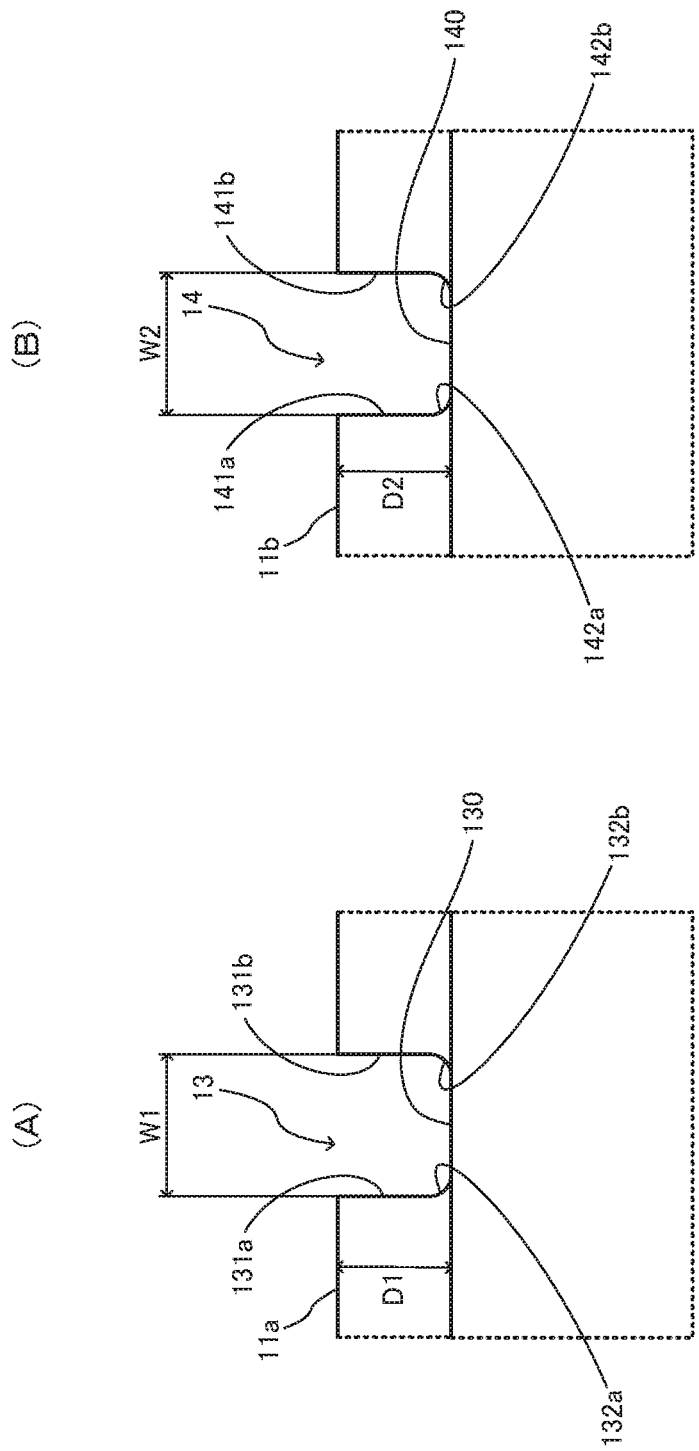
FIG. 2(A) is an enlarged view of a recessed portion 13 for gate, which is illustrated in FIG. 1(A), seen in the direction of the arrow B, and FIG. 2(B) an enlarged view of a recessed portion 14 for ejector pin seat, which is illustrated in FIG. 1(C), seen in the direction of the arrow C.

FIGS. 1(A) and 1(C) are respectively a front view and a back view of a bush 1 according to the embodiment, and FIG. 1(B) an A-A cross-sectional view of the bush 1 illustrated in FIG. 1(A). FIG. 2(A) is an enlarged view of a recessed portion 13 for gate, which is illustrated in FIG. 1(A), seen in the direction of the arrow B, and FIG. 2(B) an enlarged view of a recessed portion 14 for ejector pin seat, which is illustrated in FIG. 1(C), as seen in the direction of the arrow C.

The bush 1 of the embodiment is used in an EGR device, and slidably supports a metallic shaft that drives an EGR valve in a state that the bush 1 is fitted in a metallic housing of the EGR device. Further, the bush 1 is formed by injection molding, and as illustrated in the figures comprises: a cylindrical bush body 10; a slit 12, which is formed from one surface 11a, axial end, of the bush body 10 to the other end surface 11b; a recessed portion 13 for gate, which is formed in the one end surface 11a at the axial end of the bush body 10; and recessed portions 14 for ejector pin seat, which are formed in the other axial end surface 11b of the bush body 10.

The outer peripheral surface 15 of the bush body 10 comes in contact with a fitting surface of a fitting hole of the metallic housing of the EGR device, and the inner peripheral surface 16 of the bush body 10 comes in contact with the outer peripheral surface of the metallic shaft that drives the EGR valve.

The slit 12 is formed from the one end surface 11a toward the other end surface 11b of the bush body 10 in such a way that the slit 12 is inclined in relation to the central axis O of the bush body 10.

The recessed portion 13 for gate is formed at a gate position. This gate position is provided at a position that is at least deviated from an area (the part D illustrated in FIG. 1(A)) axisymmetric to the slit with respect to the central axis O of the bush body 10. Further, the recessed portion 13 for gate is rounded at connecting portions 132a and 132b between the bottom surface 130 and both sidewalls 131a and 131b (See FIG. 2(A)).

The recessed portions 14 for ejector pin seat are formed at ejector pin positions. These ejector pin positions are provided at positions deviated in the circumferential direction from the recessed portion 13 for gate. Further, each recessed portion 14 for ejector pin seat is rounded at connecting portions 142a and 142b between the bottom surface 140 and both sidewalls 141a and 141b (See FIG. 2(B)). Although, in the present embodiment, three recessed portions 14 for ejector pin seat are equiangularly arranged in the circumferential direction, it is sufficient that at least one recessed portion 14 for ejector pin seat is arranged.

As material of the bush 1 according to the present embodiment, is used resin that has thermostability to tolerate a high temperature environment (for example, temperature higher than or equal to 150 degrees Celsius) in which the EGR device is used and that is superior in resistance to nitric acid, sulfuric acid, and the like generated by reaction of nitrogen oxides and sulfur oxides in exhaust gas with water. As such resin, PPS resin and PEEK resin can be mentioned, for example.

Since the bush 1 according to the present embodiment of the above-described arrangement can contract and expand in radial direction owing to the slit 12 formed from the one axial end surface 11a of the bush body 10 toward the other axial end surface 11b, the bush 1 can absorb difference in thermal expansion coefficient from the metallic shaft and the metallic housing of the EGR device. Accordingly, in a state of being fitted in the metallic housing of the EGR device, the bush 1 can slidably support more reliably the metallic shaft that drives the EGR valve.

Further, in the bush 1 according to the present embodiment, the slit 12 is formed obliquely in relation to the central axis O of the bush body 10. Accordingly, in the circumferential direction, the inner peripheral surface 16 of the bush body 10 can come in sliding contact with the outer peripheral surface of the shaft, which is an object to be supported, over the whole periphery, and thus the bush 1 can slidably support more smoothly the shaft as the object to be supported.

Further, in the bush 1 according to the present embodiment, the gate position (the recessed portion 13 for gate) is provided in the one surface 11a of end in the axial direction at a position at least deviated from the position (the part D illustrated in FIG. 1(A)) that is axisymmetric to the slit 12 with respect to the central axis O of the bush body 10. In detail, if a virtual slit is provided at a position that is axisymmetric to the slit 12 with respect to the central axis O of the bush body 10, the gate position is located at such a position that the recessed portion 13 for gate does not overlap at all with the area (the part D illustrated in FIG. 1(A)) in which the one end surface 11a of the bush body 10 overlaps with the virtual slit when the one end surface 11a is seen from the outside in the axial direction. As a result, it is possible to deviate the gate position, which is weak in strength, from a place on which bending stress caused by change of the width T (See FIG. 1(B)) of the slit 12 is concentrated, and thus the strength of the bush 1 can be improved furthermore.

Figure 3:
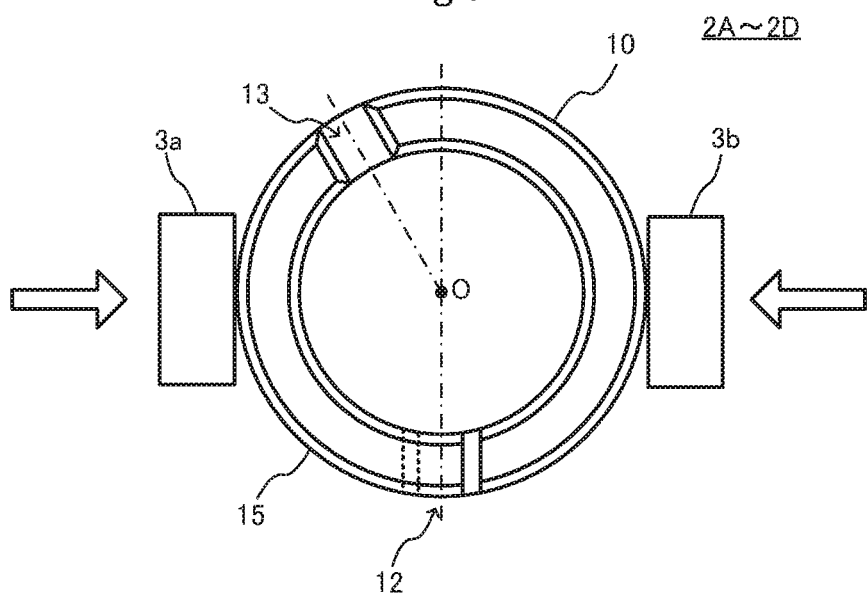
FIG. 3 is a view for explaining constraint conditions for test pieces 2A to 2D in structural analysis.

The present inventors performed structural analysis of test pieces 2A to 2D of the bush 1 illustrated in the following Table 1 (as for the measurements in the table, See FIGS. 1 and 2) under the conditions illustrated in the following Table 2. And, circumferential direction strain data were obtained by nipping, as illustrated in FIG. 3, the outer peripheral surfaces 15 of the test pieces 2A to 2D with constraining objects 3a and 3b to contract the diameter of the bush 1 in a state that the slit 12 is positioned at the center.

TABLE 1

| | Test piece | | | |
| --- | --- | --- | --- | --- |
| | 2A (comparison example) | 2B | 2C | 2D |
| Gate position | 0 degrees | 15 degrees | 30 degrees | 45 degrees |
| Recessed portion for gate | Seat width W1: 2 mm; Depth D1: 0.8 mm | | | |

TABLE 1-continued

| | Test piece | | | |
|---|---|---|---|---|
| | 2A (comparison example) | 2B | 2C | 2D |
| Bush body | Length L: 8 mm; Outer diameter M1: 11.5 mm; Inner diameter M2: 8 mm | | | |
| Slit | Width T: 0.5 mm; Inclination R to the axial direction: 15 degrees | | | |
| Recessed portion for ejector pin seat | Seat width W2: 2 mm; Depth D2: 0.8 mm | | | |

In the Table 1, the gate position means an angle G (See FIG. 1(A)) between a plane 30 that includes the central axis O of the bush body 10 and the midpoint P of the slit 12 and a plane 31 that includes the central axis O of the bush body 10 and the midpoint Q of the recessed portion 13 for gate. Further, the number and arrangement positions of the recessed portions 14 for ejector pin seat are common to all the test pieces 2A to 2D.

TABLE 2

| Analysis condition | Linear static analysis; Element type: tetrahedral second order element |
|---|---|
| Bush diameter contraction quantity | 0.68 mm |
| Bush material characteristics (PPS resin) | Elastic coefficient: 3800 MPa; Poisson ratio: 0.37 |
| Ambient temperature | 23° C. |

Figure 4:
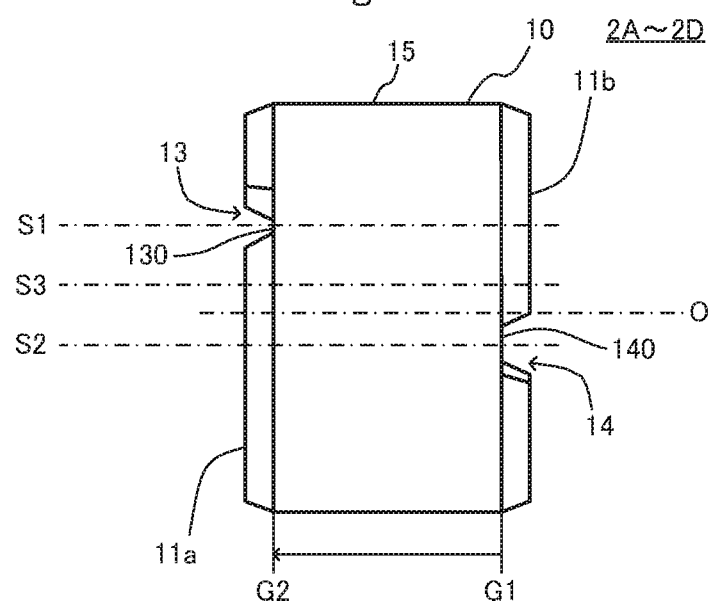
FIG. 4 is a view for explaining measurement points of the test pieces 2A to 2D in the structural analysis.

As illustrated in FIG. 4, measurement points of the circumferential direction strain data were set at intervals of 0.5 mm on each of lines in the outer peripheral surface 15 of the bush body 10, namely, the line S1 that passes the center of the recessed port ion 13 for gate and is parallel to the central axis O of the bush body 10, the line S2 that passes the center of the recessed portion 14 for ejector pin seat closest in the circumferential direction to the recessed portion 13 for gate and is parallel to the central axis O of the bush body 10, and the line S3 that passes the center between the line S1 and the line S2 and is parallel to the central axis O of the bush body 10, from the position G1 intersecting a plane that is perpendicular to the central axis O of the bush body 10 and includes the bottom surfaces 140 of the recessed portions 14 for ejector pin seat toward the position G2 intersecting a plane that is perpendicular to the central axis O of the bush body 10 and includes the bottom surface 130 of the recessed portion 13 for gate.

FIGS. 5(A) to 5(C) are diagrams showing analysis results of the structural analysis of the test pieces 2A to 2D of the bush 1. FIG. 5(A) shows the measurement results of the circumferential direction strain data at each measurement point on the line S1 that passes, in the outer peripheral surface 15 of the bush body 10, the center of the recessed portion 13 for gate and is parallel to the central axis O of the bush body 10. FIG. 5(B) shows the measurement results of the circumferential direction strain data at each measurement point on the line S2 that passes, in the outer peripheral surface 15 of the bush body 10, the center of the recessed portion 14 for ejector pin seat closest in the circumferential direction to the recessed portion 13 for gate and is parallel to the central axis O of the bush body. And, FIG. 5(C) shows the measurement results of the circumferential direction strain data at each measurement point on the line S3 that passes, in the outer peripheral surface 15 of the bush body 10, the center between the line S1 and the line S2 and is parallel to the central axis O of the bush body 10.

In FIGS. 5(A) to 5(C), each vertical axis indicates circumferential direction strain at measurement point, and each horizontal axis distance of measurement point from the position G1 illustrated in FIG. 4. Further, the graphs 2A-S1 to 2A-S3 indicate measurement results of the test piece 2A, the graphs 2B-S1 to 2B-S3 measurement results of the test piece 2B, the graphs 2C-S1 to 2C-S3 measurement results of the test piece 2C, and the graphs 2D-S1 to 2D-S3 measurement results of the test piece 2D.

From the results illustrated in FIGS. 5(A) to 5(C), it is found that the test pieces 2B to 2D whose gate positions G are other than the gate position G at 0 degrees have smaller circumferential direction strains than the test piece 2A whose gate position G is at 0 degrees. In particular, on the line S1 in the outer peripheral surface 15 of the bush body 10, which passes the center (the gate position) of the recessed portion 13 for gate that is weak in strength, and is parallel to the central axis O of the bush body 10, it is found that circumferential direction strain becomes smaller as the angle of the gate position G becomes larger.

Figure 6:
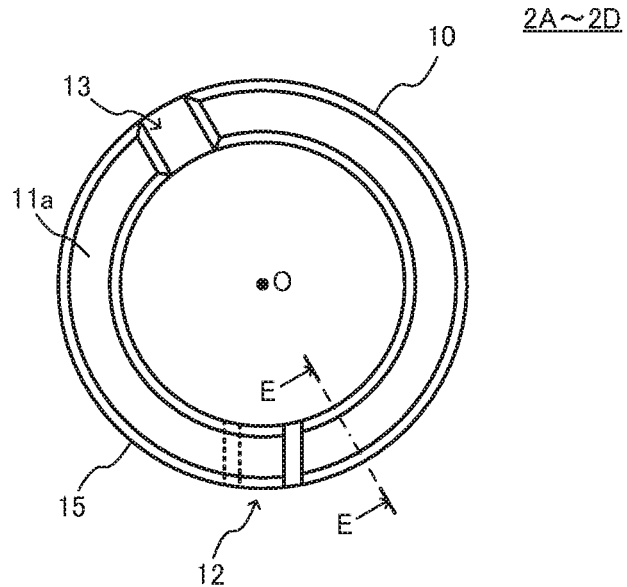
FIG. 6 is a view for explaining measurement points of the test pieces 2A to 2D in flow analysis.

Further, the present inventors performed flow analysis of the test pieces 2A to 2D of the bush 1 illustrated in the above Table 1. And, as illustrated in FIG. 6, data of pressure distribution in the E-E cross-section in the neighborhood of the slit 12 were obtained at the time of the end of pressure keeping in the injection molding. As a result, it is found that, as for the test piece 2D whose gate position G is 45 degrees, an area of higher pressure than those of the others exists on the side of the one end surface 11a in which the recessed portion 13 for gate is formed, and thus there is a possibility of occurrence of a burr in a molded article.

From the results of the above-described structural analysis and flow analysis, it is found that as the angle of the gate position G is larger, the strength of the bush 1 is enhanced, while there occurs a problem in moldability when the gate position G exceeds a certain angle. Accordingly, it is favorable from the viewpoint of strength of the bush 1 to increase the angle of the gate position G within the range causing no problem in moldability. In the above results, the angle of the gate position G was preferably larger than 0 degrees and smaller than 45 degrees. In particular, at the angle of 30 degrees, good results were obtained in both strength and moldability of the bush 1.

Further, in the present embodiment, the connecting portions 132a and 132b between the bottom surface 130 and both sidewalls 131a and 131b of the recessed portion 13 for gate are rounded. Similarly, the connecting portions 142a and 142b between the bottom surface 140 and both sidewalls 141a and 141b of each recessed portion 14 for ejector pin seat are rounded. Accordingly, it is possible to improve strength of the connecting portions 132a, 132b, 142a, 142b of these recessed portions 13, 14, and the strength of the bush 1 can be improved furthermore.

Further, in the present embodiment, at positions deviated in the circumferential direction from the recessed portion 13 for gate formed in the one end surface 11a of the bush body 10, there are formed the recessed portions 14 for ejector pin seat formed in the other end surface 11b of the bush body 10. Accordingly, it is possible to prevent forming of a part that is short in length in the axial direction in the bush body 10 owing to overlapping of a recessed portion 14 for ejector pin seat with the recessed portion 13 for gate in position in the circumferential direction.

The present invention is not limited to the above embodiment, and can be varied variously within the scope of the invention.

For example, although in the above embodiment the slit 12 is formed from the one end surface 11a of the bush body 10 toward the other end surface 11b in such away that the slit 12 is inclined in relation to the central axis O of the bush body 10, the present invention is not limited to this. The slit 12 can be formed in parallel with the central axis O of the bush body 10.

Further, in the above embodiment, although the gate position is provided in the one end surface 11a, in the axial direction, of the bush body 10, the present invention is not limited to this. The gate position can be provided in the outer peripheral surface 15 of the bush body 10. In this case also, the gate position is provided at a position that is at least deviated from an area axisymmetric to the slit with respect to the central axis O of the bush body 10. It is not necessary to form a recessed portion 13 for gate in the one end surface 11a, in the axial direction, of the bush main body 10.

The present embodiment has been described taking, as an example, the bush 1 used in an EGR device, the present invention is not limited to this. The bush of the present invention can be applied to bushes used in various fields for supporting slidably an object to be supported, and in particular suitable for cases where a bush slidably supports a metallic shaft in a state that the bush is fitted in a metallic housing.

Further, in the present embodiment, as the material of the bush 1, is used resin that is superior in heat resistance and chemical resistance such as PPS resin, PEEK resin, or the like. This assumes that the bush 1 is used in an EGR device. The material of the bush of the present invention can be resin having characteristics suitable for its use, and it is also possible to add an additive for improving slidability.

REFERENCE SIGNS LIST

1: bush; 10: bush body; 11a, 11b: axial end surface of the bush body 10; 12: slit; 13: recessed portion for gate; 14: recessed portion for ejector pin seat; 15: outer peripheral surface of the bush body 10; 16: inner peripheral surface of the bush body 10; 130: bottom surface of the recessed portion 13 for gate; 131a, 131b: sidewall of the recessed portion 13 for gate; 132a, 132b: connecting portion of the recessed portion 13 for gate; 140: bottom surface of the recessed portion 14 for ejector pin seat; 141a, 141b: sidewall of the recessed portion 14 for ejector pin seat; and 142a, 142b: connecting portion of the recessed portion for ejector pin seat.

The invention claimed is:

1. A bush for supporting slidably a shaft comprising:
a cylindrical bush body: and
a slit formed from one end surface at an axial end of the cylindrical bush body toward another end surface, wherein:
the bush is produced by injection molding;
a gate position is provided in the one end surface or in an outer peripheral surface at a position that is at least deviated from a position axisymmetric to the slit with respect to a central axis of the cylindrical bush body wherein:
the bush further comprises a recessed portion for gate, which is formed at the gate position in the one end surface and a recessed portion for ejector pin seat, which is formed in the other end surface;
connecting portions between a bottom surface and sidewalls of the recessed portion for gate are rounded, and
the recessed portion for ejector pin seat is formed at position that is deviated in circumferential direction from the recessed portion for gate.

2. A resin bush for supporting slidably a shaft comprising:
a cylindrical bush body; and
a slit formed from one end surface at an axial end of the cylindrical bush body toward another end surface, wherein:
the slit is formed to be inclined in relation to a central axis of the cylindrical bush body;
the bush is produced by injection molding,
a gate position is provided in the one end surface or in an outer peripheral surface at a position that is at least deviated from a position axisymmetric to the slit with respect to a central axis of the cylindrical bush body wherein:
the bush further comprises a recessed portion for gate, which is formed at the gate position in the one end surface and a recessed portion for ejector pin seat, which is formed in the other end surface;
connecting portions between a bottom surface and sidewalls of the recessed portion for gate are rounded; and
the recessed portion for ejector pin seat is formed at position that is deviated in circumferential direction from the recessed portion for gate.

3. A bush of claim 1, wherein:
the bush supports slidably the shaft in a state that the bush is fitted in a fitting hole of a housing;
an outer peripheral surface of the cylindrical bush body is in contact with a fitting surface of the fitting hole of the housing; and
an inner peripheral surface of the cylindrical bush body is in sliding contact with an outer peripheral surface of the shaft.

4. A bush of claim 2, wherein:
the bush supports slidably the shaft in a state that the bush is fitted in a fitting hole of a housing;
an outer peripheral surface of the cylindrical bush body is in contact with a fitting surface of the fitting hole of the housing; and
an inner peripheral surface of the cylindrical bush body is in sliding contact with an outer peripheral surface of the shaft.

* * * * *